United States Patent [19]
Snidar et al.

[11] 3,909,084
[45] Sept. 30, 1975

[54] BALL JOINT CONSTRUCTION

[75] Inventors: Edward A. Snidar, Palm Harbor, Fla.; Donald R. Gaines, Farmington Hills; William H. Trudeau, Brighton, both of Mich.

[73] Assignee: Gulf & Western Manufacturing Company (Michigan), Southfield, Mich.

[22] Filed: May 16, 1974

[21] Appl. No.: 470,540

[52] U.S. Cl. ................................. 308/72; 403/135
[51] Int. Cl.² ........................................ F16C 11/06
[58] Field of Search ........... 403/135, 140, 132, 133; 308/72

[56] References Cited
UNITED STATES PATENTS

| | | | |
|---|---|---|---|
| 3,115,375 | 12/1963 | Haller | 308/72 |
| 3,486,778 | 12/1969 | Herbenar et al. | 403/140 |
| 3,578,366 | 5/1971 | Snider | 403/140 |
| 3,650,552 | 3/1972 | Schmid | 403/140 |

*Primary Examiner*—Andrew V. Kundrat
*Attorney, Agent, or Firm*—Barnes, Kisselle, Raisch & Choate

[57] ABSTRACT

A ball joint construction with a retainer having a pair of interlocking rings received in a housing and movably mounting a ball stud therein. At least one ring of the retainer has a side wall with radially spaced inner and outer portions adjacent an outboard edge thereof with generally radially extending webs interposed therebetween to continuously yieldably bias the retainer into firm engagement with a mating surface of the ball stud to compensate for wear of the mating surfaces as the ball joint construction is used, thereby providing increased service life thereof. This arrangement also yieldably biases a resilient lip carried by the one retainer ring into sealing engagement with a mating surface of the ball stud.

6 Claims, 7 Drawing Figures

U.S. Patent  Sept. 30, 1975  3,909,084
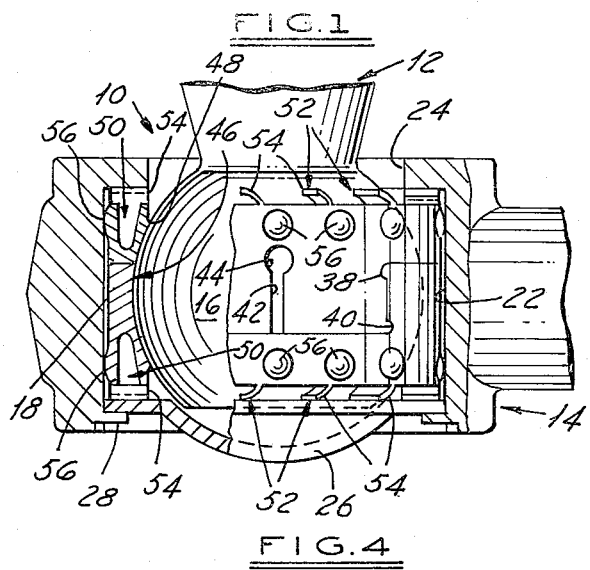
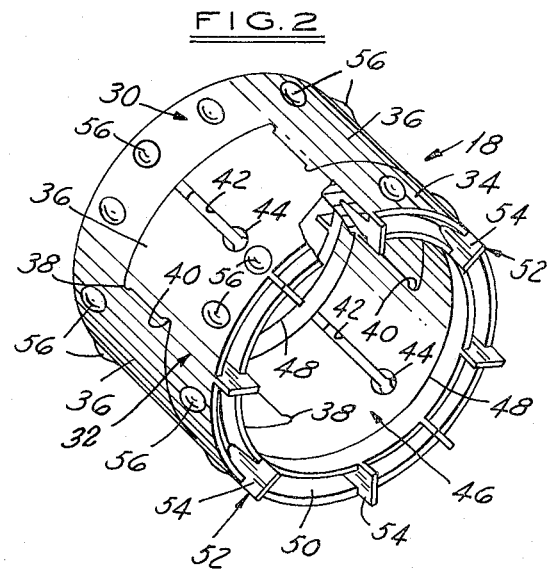
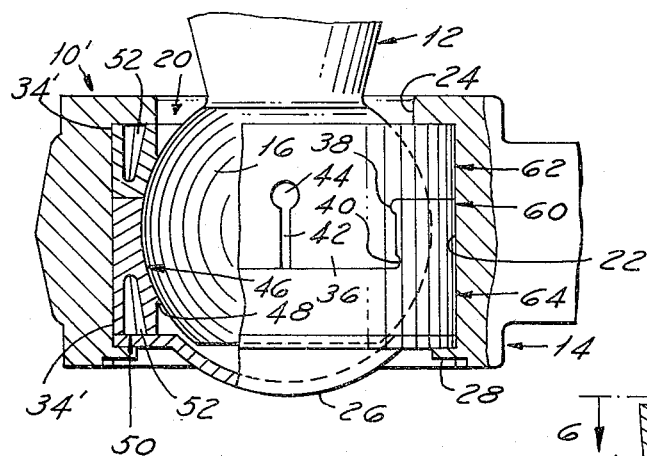
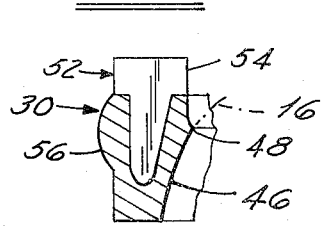
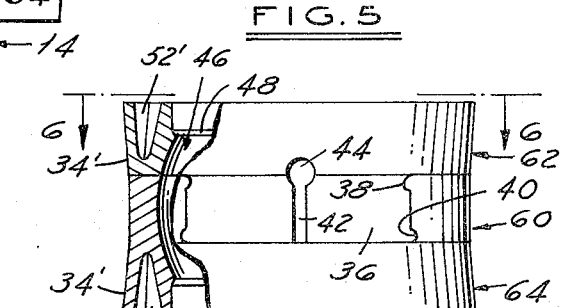
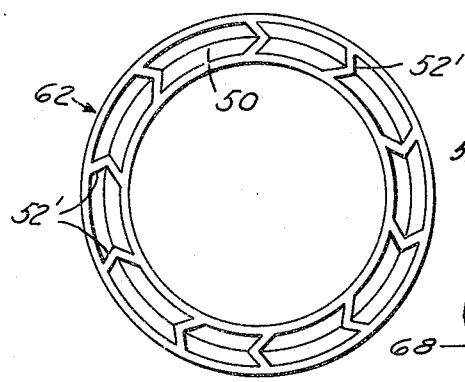
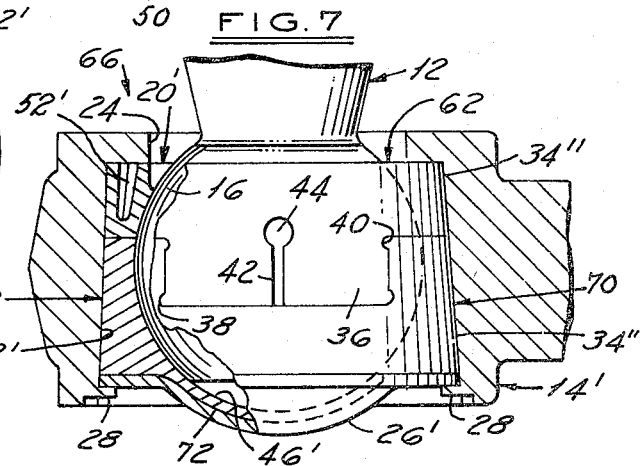

BALL JOINT CONSTRUCTION

This invention relates to ball joints at the type commonly used in motor vehicle front suspension steering linkages.

Ball joints in which a bearing retainer mounts a ball stud in a cavity of a housing are not broadly new. Such a ball joint construction in which a retainer of a plastic material is backed by a fibrous material impregnated with a lubricant to provide a self-lubricating ball joint which does not require any further lubrication throughout its service life is disclosed in Snider U.S. Pat. No. 3,578,366, issued Nov. 28, 1969. Another ball joint in which a onepiece retainer of a plastic material is urged by the cavity of the housing into engagement with the ball of the stud to compensate when in service for wear between the mating surfaces of the ball and retainer is shown in Kindel U.S. Pat. No. 3,530,495, issued Sept. 22, 1970.

Objects of this invention are to provide a ball joint construction having improved sealing characteristics between the retainer and the ball, improved compensation for wear during service between the retainer and the ball, a longer useful life, and more economical manufacture and assembly than previously known ball joint constructions.

These and other objects, features and advantages of this invention will be apparent from the following description, appended claims and accompanying drawing in which:

FIG. 1 is a fragmentary sectional view of a ball joint construction embodying this invention.

FIG. 2 is an enlarged isometric view of the retainer of FIG. 1.

FIG. 3 is an enlarged fragmentary sectional view of one of the rings of the retainer of FIG. 1.

FIG. 4 is a fragmentary sectional view of a ball joint embodying this invention with a modified retainer.

FIG. 5 is a side view partially in section of the modified retainer of the ball joint of FIG. 4.

FIG. 6 is a view on line 6—6 of FIG. 5.

FIG. 7 is a fragmentary sectional view of a modified ball joint embodying this invention.

Referring in more detail to the drawing, FIG. 1 illustrates a ball joint construction embodying this invention with a ball stud 12 received in a socket or housing 14. Stud 12 has a ball 16 contained in a retainer 18 received in a cavity 20 in housing 14 defined by a cylindrical side wall 22 and an integral shoulder 24. Retainer 18 and an underlying cover disc 26 are retained in cavity 20 by circumferentially spaced stakes 28.

As shown in FIGS. 1 and 2, retainer 18 has a pair or rings 30 and 32 preferably of identical construction each with a continuous wall portion 34 adjacent the outboard edge of the retainer and interrupted generally rectangular and cylindrically curved wall portions 36 adapted to be interdigitally received in assembly of the rings. To releasably interlock rings 30 and 32, each interrupted wall portion 36 preferably has a pair of small projections 38 at its distal corners and a pair of small recesses 40 at its adjacent corners. Each interrupted wall portion 36 is preferably provided with an axial slot 42 terminating in a hole 44 to facilitate flexing of wall portion 36 when the rings are snapped into interlocking engagement and to permit transfer of lubricants in housing 14 to ball 16 of stud 12. In assembly, rings 30 and 32 provide a retainer 18 with a generally spherical inner peripheral surface 46 which is circumferentially substantially continuous and adapted to engage a substantial equatorial area of ball 16 between the poles thereof with interrupted wall portions 36 overlying the equator of the ball. Rings 30 and 32 each have a circumferentially continuous resilient lip 46 adjacent ar outboard edge thereof which in its free state projects generally radially inwardly of spherical surface 46 (as shown in FIG. 3) to provide in assembly a seal keeping contaminants out of the equatorial area of ball 16 and retaining lubricant therein. Snidar U.S. Pat. No 3,578,366, issued Nov. 28, 1969, which is incorporated herein by reference may be referred to for a more detailed disclosure of the structure and function of a bal retainer with interlocking rings as thus far described.

Each ring 30 and 32 has a circumferentially and axially extending groove 50 in the outboard edge thereof defining radially spaced inner and outer peripheral portions of wall 34 which have a plurality of circumferentially spaced homogeneously integral webs 52 extending generally radially therebetween. Preferably, each web 52 terminates in a flexible resilient generally rectangular tab 54 which in a free state extends generally axially beyond the outer edge of its associated ring (as shown in FIG. 3). A plurality of circumferentially spaced projections 56 are provided on the outer peripheral wall portion 34 of each ring 30 and 32 and are dimensioned in relation to cavity 20 to urge wall portion 34 generally radially inwardly when retainer ring 18 is assembled in cavity 20 of housing 14.

In assembling the component parts of ball joint 10. rings 30 and 32 of retainer 18 are aligned generally axially with ball stud 12 in opposed spaced apart relation and snapped into interlocking engagement with each other to entrap ball 16 within retainer 18. Stud 12 is inserted through cavity 20 of housing 14 and retainer 18 is passed into cavity 20 with an interference fit of at least projections 56 with side wall 22 thereof. As retainer 18 is inserted into cavity 20, projections 56 cam the outer peripheral portion of wall 34 generally radially inwardly which places webs 52 in compression and urges spherical surface 46 and sealing lips 48 of the retainer into firm engagement with ball 16 (as shown in FIG. 1). The extent of the interference fit between projections 56 of retainer 18 and side wall 22 of housing cavity 20 is great enough to provide sufficient compressive force to continuously urge sealing lips 48 and spherical surface 46 into engagement with ball 16 throughout the service life of ball joint 10 to thereby provide an adequate seal and compensate for wear on the mating surfaces of the ball and retainer. Without compensation for such wear in service a clearance would develop between the mating surfaces resulting in a loose or wobbly ball joint and loss of the initial torque or frictional characteristics of the ball joint. Cover 26 is positioned under retainer 18 in cavity 20 and secured therein by staking at 28. The axial extent of cavity 20 with cover 26 staked therein is less that the axial distance between the free ends of flexible tabs 54 on opposed edges of retainer 18 and, hence, in assembly tabs 54 are flexed (as shown in FIG. 1) to provide a slightly resilient mounting of retainer 18 and thus ball stud 12 in housing 14 permitting slight generally axial displacement of the ball stud relative to the housing. This slightly resilient mounting increases the amount of shock and impact to which ball joint 10 can be subjected without damage thereto.

FIG. 4 illustrates a ball joint construction 10' with a modified retainer 60 and a ball stud 12 and housing 14 identical with the ball stud and housing of ball joint 10. As shown in FIGS. 4 and 5, retainer 60 has a pair of interlocking rings 62 and 64 each with a side wall having circumferentially continuous portion 34' and curved radially extending interrupted portions 36 each with a slot 42 therein and detents 38 and recesses 40 thereon which releasably lock in interdigitating engagement. Each ring 60 and 62 has an axially and circumferentially extending groove 50 in an outboard edge thereof providing inner and outer peripheral portions of the wall with homogeneously integral webs 52' extending generally radially therebetween which are generally chevron or V-shaped as shown in FIG. 6. As shown in FIG. 5, retainer 60 when in a free state has a tapered exterior surface on each wall portion 34' with a maximum diameter adjacent an outboard edge greater than the diameter of cylindrical surface 22 of cavity 20 of housing 14 and a generally cylindrical center portion with a diameter substantially equal to the diameter of cylindrical surface 22 of the cavity. When retainer 60 is assembled in ball joint 10', the tapered outer peripheral portions of the side walls of rings 62 and 64 are forced generally radially inwardly which places webs 52' in compression and urges spherical surface 46 and lips 48 of the retainer into firm engagement with ball 16 in substantially the same manner as retainer 18 of ball joint construction 10 to provide an adequate seal and wear compensation.

FIG. 7 shows a modified ball joint construction 66 embodying this invention with a ball stud 12 mounted in a housing 14' by a retainer 68 received in a cavity 20' in the housing with a tapered side wall 22'. Retainer 68 and a cover disc 24' are retained in cavity 20' by stakes 28. Retainer 68 has a pair of releasably interlocking rings 62 and 70. Ring 70 has a side wall with a substantially circumferentially continuous portion 34'' and curved generally axially extending interrupted portions 36 each with a slot 42 terminating in a hole 44 therein (not shown) and projections 38 and detents 40 for interdigital locking engagement with ring 62 of retainer 68. Ring 70 has a continuous imperforate end wall 72 underlying in assembly a polar portion of ball 16 and homogeneously integral with side wall 34'' with an outer surface contoured for engagement with cover disc 26'. Ring 70 has an inner spherical surface 46' for mating engagement with ball 16 and a tapered outer peripheral surface dimensioned for wedging engagement with tapered surface 22' of cavity 20 to urge spherical surface 46' into firm mating engagement with ball 16 when retainer 68 is assembled in ball joint 66. The outer wall portion of ring 62 is deflected generally radially inwardly to compress ribs 52' and urge lip 48 and spherical surface 46 thereof into firm engagement with ball 16 when retainer 68 is assembled in ball joint 66, to provide an adequate seal and compensation for the wearing away in service of the mating surfaces of ball 16 and retainer 68. Preferably, ring 70 of retainer 68 is made of a less resilient and more rigid and abrasion resistant plastic material than ring 62 such as acetal plastic. The use of a more rigid plastic material with better wear characteristics in ring 70 provides increased useful life for ball joint 66 while retaining the wear compensation feature provided by ring 62 of retainer 68. A slightly resilient and flexible plastic material such as polyethylene plastic is suitable for making ring 62 of retainer 68 and rings 30, 32 and 62, 64 of retainers 18 and 60 respectively.

The slightly resilient mounting of ball stud 12 in ball joint 10 embodying this invention provided by flexible tabs 54 of retainer 18 increases the shock, impact and fatigue resistance of the ball joint. The retainer structure with radially spaced inner and outer side wall portions with circumferentially spaced webs interposed therebetween yieldably biasing the retainer sealing lip and spherical inner surface into engagement with a mating surface of the ball stud provides improved sealing which is particularly important in permanently lubricated ball joints and improved retainer wear compensation substantially increasing the useful service life of the ball joint construction and facilitating ease and economy of manufacture and assembly thereof.

We claim:

1. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer generally axially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, and a plurality of resilient tabs extending in free state generally axially beyond said one outer edge of said body and being homogeneously integral with said body, said tabs being dimensioned such that they are flexed when said retainer is assembled in the cavity to resiliently mount the ball stud in the housing for slightly generally axial displacement in at least one direction with respect to the housing.

2. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer generally axially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, and a plurality of resilient tabs extending in free state generally axially outwardly of both said one outer edge of said body and another outer edge at the opposite end of said body, said tabs being homogeneously integral with said body and being dimensioned such that they are flexed when said retainer is assembled in the cavity to resiliently mount the ball stud in the housing for slight generally axial displacement in both directions with respect to the housing.

3. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer generally axially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, said annular wall having a generally axially and circumferentially extending second groove therein opening into the other outer edge of said annular wall to provide generally radially spaced apart second inner and outer circumferentially extending portions thereof homogeneously integral therewith, and a plurality of circumferentially spaced second webs in said second groove interposed between and homogeneously integral with said second inner and outer portions of said annular wall, said second outer portion of said annular wall being dimensioned with respect to the cavity of the housing such that in assembly it is displaced generally radially inwardly adjacent said other outer edge to place said second webs in compression and urge said inner generally spherical peripheral surface into mating engagement with the ball of the stud as the mating surfaces wear away during in service use of the ball joint construction, said webs terminating in a plurality of integral webs extending in free state generally axially outwardly of their associated outer edges of said body with said tabs being dimensioned to resiliently mount the ball stud in the cavity of the housing for slight generally axial displacement in both directions with respect to the housing.

4. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer generally axially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, said webs in cross section having a generally V-shape.

5. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer radially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, said annular wall having a generally axially and circumferentially extending second groove therein opening into the other outer edge of said annular wall to provide generally radially spaced apart second inner and outer circumferentially extending portions thereof homogeneously integral therewith, and a plurality of circumferentially spaced second webs in said second groove interposed between and homogeneously integral with said second inner and outer portions of said annular wall, said second outer portion of said annular wall being dimensioned with respect to the cavity of the housing such that in assembly it is displaced generally radially inwardly adjacent said other outer edge to place said second webs in compression and urge said inner generally spherical peripheral surface into mating engagement with the ball of the stud as the mating surfaces wear away during in service use of the ball joint construction, said webs in cross section having a generally V-shape.

6. A retainer for a ball joint construction having a stud with a ball received in a cavity in a housing comprising a body of a slightly resilient high density plastic bearing material having an annular wall with an inner generally spherical peripheral surface to surround and slidably engage in assembly a relatively large equatorial area of the ball around an axis substantially coincident with the axis of the stud, said annular wall having a generally axially and circumferentially extending first groove therein opening into one outer edge of said annular wall to provide generally radially spaced apart first inner and outer generally axially and circumferentially extending portions thereof homogeneously integral therewith, a plurality of circumferentially spaced first webs in said groove interposed between and homogeneously integral with said first inner and outer portions of said annular wall, said first outer portion of said annular wall being dimensioned with respect to the cavity of the housing such that in assembly it is displaced generally radially inwardly adjacent said one outer edge to place said first webs in compression and urge said inner generally spherical peripheral surface into mating engagement with the ball of the stud whereby said inner generally spherical peripheral surface continues to engage the ball of the stud as the mating surfaces wear away during in service use of the ball joint construction, said body comprising a pair of rings each having an inner generally spherical recess providing a part of said inner generally spherical peripheral surface and having a continuous portion to overlie a portion of the ball of the stud between the equator and the poles of the ball and interrupted portions overlying the equator of the ball, said interrupted portions of said rings interdigitating to form a substantially continuous portion of said inner peripheral general spherical surface and being shaped to interlock with each other so as to prevent disassembly when pressed together, said webs in cross section having a generally V-shape.

* * * * *

UNITED STATES PATENT OFFICE
CERTIFICATE OF CORRECTION

PATENT NO. : 3,909,084
DATED : September 30, 1975
INVENTOR(S) : Edward A. Snidar et al It is certified that error appears in the above-identified patent and that said Letters Patent are hereby corrected as shown below:

Col. 5, Line 64, change "webs" to "tabs".

Signed and Sealed this sixteenth Day of December 1975

[SEAL]

Attest:

RUTH C. MASON
Attesting Officer

C. MARSHALL DANN
Commissioner of Patents and Trademarks